Patented July 1, 1924.

1,499,611

UNITED STATES PATENT OFFICE.

JAMES H. GRAVELL, OF ELKINS PARK, PENNSYLVANIA.

PHOSPHORIC ACID IN DEHYDRATED FORM AND METHOD OF MAKING THE SAME.

No Drawing.  Application filed May 9, 1922. Serial No. 559,597.

*To all whom it may concern:*

Be it known that I, JAMES H. GRAVELL, a citizen of the United States, residing at Elkins Park, in the county of Montgomery and State of Pennsylvania, have invented a new and useful Improvement in Phosphoric Acid in Dehydrated Form and Methods of Making the Same, of which the following is a specification.

This invention relates to ortho phosphoric acid and has for its object the production of such acid free from or deprived of water. The usual methods of making phosphoric acid in the commercial way are so well known that they will not be described, suffice it to say that they consist in the decomposition of phosphates by the action of heat or an acid or in dissolving phosphorus in nitric acid; the resulting acid in all cases contains a percentage of water which is very objectionable when it is desired to use the acid for certain purposes such for instance as when it is desired to mix the acid and an oil as in certain rust inhibitive compositions.

According to my invention phosporic acid may be made by any of the well known methods as by adding calcium phosphate to an aqueous solution of sulphuric acid or by dissolving phosphorus in nitric acid. The acid thus formed will have a certain water content, and to the phosphoric acid thus made I add phosphorus pentoxide which combines with the water present to form additional phosphoric acid. By carefully calculating or determining the amount of water present and then adding the proper amount of phosphorus pentoxide one hundred percent dehydrated phosphoric acid can be obtained. It is evident that the less water present in the original acid, the less phosphorus pentoxide will be required and as the original acid is commercially cheaper than the phosphorus pentoxide it pays to use as strong an acid as possible.

I find in practice that acid commercially known as 85% phosphoric acid is most suitable as a basis for the preparation of 100% dehydrated acid, because of the commercial acids it contains the least water. To 100 parts by weight of the 85% acid, I add 39.4 parts by weight of phosphorus pentoxide ($P_2O_5$), and obtain a syrupy liquid consisting of phosphoric acid free from water. The phosphorus pentoxide should be added to the acid slowly as considerable heat is developed by the chemical reaction.

The dehydrated acid thus formed is at first a liquid but on long standing it tends to crystallize which is a decided objectionable commercial characteristic. I find however that this objection can be readily overcome by dissolving the dehydrated acid in a solvent which is free from water. Such solvents as ethyl alcohol, ethyl acetate and acetone have been found very satisfactory. Commercial denatured alcohol, although containing a small percentage of water will be found in most cases entirely satisfactory as the small percentage of water contained therein may be commercially neglected. One of the most satisfactory solvents is butyl alochol due to its nonvolatile characteristics and the ease with which it mixes with various oils. The dehydrated phosphoric acid dissolved in butyl alcohol may be added to solutions containing oil without causing the acid to precipitate thus producing a consolute solution of phosphoric acid and oil.

The amount of solvent used may be varied at will according to the characteristics of the solvent and the uses to which the solution is applied. I find a very satisfactory commercial article is obtained by using equal parts by volume of dehydrated acid and butyl alcohol.

I claim:

1. The method of making phosphoric acid in liquid and dehydrated form which consists in treating phosphoric acid with phosphorus pentoxide and adding alcohol.

2. As an article of manufacture a liquid admixture of phosphoric acid in dehydrated form and butyl alcohol.

JAMES H. GRAVELL.